(12) United States Patent
Jones, IV et al.

(10) Patent No.: US 7,466,667 B2
(45) Date of Patent: Dec. 16, 2008

(54) ADAPTIVE PACKET DETECTION FOR DETECTING PACKETS IN A WIRELESS MEDIUM

(75) Inventors: Vincent K. Jones, IV, Redwood City, CA (US); Partho Mishra, Cupertino, CA (US); Geert Arnout Awater, Utrecht (NL); D. J. Richard van Nee, De Meern (NL); Arnold Liu, San Jose, CA (US); Brian Leslie Wong, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 699 days.

(21) Appl. No.: 11/064,761

(22) Filed: Feb. 22, 2005

(65) Prior Publication Data

US 2005/0190786 A1 Sep. 1, 2005

Related U.S. Application Data

(60) Provisional application No. 60/546,365, filed on Feb. 20, 2004.

(51) Int. Cl.
*H04B 7/005* (2006.01)
*H04J 3/16* (2006.01)
*H04J 3/22* (2006.01)

(52) U.S. Cl. .................. 370/278; 370/465
(58) Field of Classification Search .......... 370/200–546
See application file for complete search history.

(56) References Cited

U.S. PATENT DOCUMENTS

| 6,473,467 | B1 * | 10/2002 | Wallace et al. | 375/267 |
| 2001/0033603 | A1 * | 10/2001 | Olaker | 375/143 |
| 2004/0032825 | A1 * | 2/2004 | Halford et al. | 370/208 |
| 2004/0190560 | A1 * | 9/2004 | Maltsev et al. | 370/503 |

FOREIGN PATENT DOCUMENTS

EP 648 032 A1 4/1995

OTHER PUBLICATIONS

Halls, G. A., "Hiperlan—The 20 MBIT/S Radio Lan," *IEE Colloquim on Radio LANs and MANs . . .* , pp. 1-8 (1995).

* cited by examiner

*Primary Examiner*—Chirag G Shah
*Assistant Examiner*—Srinivasa R Reddivalam
(74) *Attorney, Agent, or Firm*—Amin, Turocy & Calvin, LLP

(57) ABSTRACT

In a packet detector, one or more tests are performed for packet detection according to packet detection parameters associated with the one or more tests, a rate of false detection is measured, and the packet detection parameters are adjusted accordingly to reduce the rate of false detection. The rate of false detection might be determined by analyzing post-detection and processing of a signal deemed to be a signal representing a packet for a failure of decoding indicative of a false detection. Such analysis might include testing for a failed SFD search, training symbol anomalies, poor conditioning of metrics used to determine frequency offset and OFDM timing, incorrect data fields, or the like.

23 Claims, 3 Drawing Sheets

ADAPTIVE PACKET DETECTION FOR DETECTING PACKETS IN A WIRELESS MEDIUM

CROSS-REFERENCE TO RELATED APPLICATIONS

This application claims priority from U.S. Provisional Patent Application No. 60/546,365 filed Feb. 20, 2004 entitled ADAPTIVE PACKET DETECTION FOR DETECTING PACKETS IN A WIRELESS MEDIUM which is hereby incorporated by reference, as if set forth in full in this document, for all purposes.

The present disclosure may be related to the following commonly assigned applications/patents:

U.S. Pat. No. N/A (U.S. patent application Ser. No. 10/068,360, filed on Feb. 5, 2002 and entitled "Multi-Antenna Wireless Receiver Chain With Vector Decoding") to Steele, et al. (hereinafter "Steele I");

U.S. Pat. No. 7,161,996 (U.S. patent application Ser. No. 10/376,079, filed on Feb. 26, 2003 and entitled "Multi-Antenna Wireless Receiver Chain With Vector Decoding") to Steele, et al. (hereinafter "Steele II");

U.S. Pat. No. N/A (U.S. patent application Ser. No. 10/642,070, filed Aug. 15, 2003 and entitled "Joint Packet Detection in Wireless Communication System with One or More Receiver") to Awater, et al. (hereinafter "Awater");

U.S. Provisional Patent Application No. 60/461,999, filed Apr. 9, 2003 and entitled "Modified Preamble Structure for IEEE 802.11A Extensions";

U.S. Pat. No. N/A (U.S. patent application Ser. No. 10/820,440, filed on Apr. 5, 2004 and entitled "Modified Preamble Structure for IEEE 802.11A Extensions to Allow for Coexistence and Interoperability Between 802.11a Devices and Higher Data Rate, MIMO or Otherwise Extended Devices") to Gardner, et al. (hereinafter "Gardner").

The respective disclosures of these applications/patents are incorporated herein by reference in their entirety for all purposes.

BACKGROUND OF THE INVENTION

Wireless networks have become increasingly popular, as computers and other devices can be coupled for data communications without requiring wired connections between the network nodes. One set of standards for wireless networks is the IEEE 802.11 standards, but other wireless standards or protocols might be used instead.

Because wireless networks are expected to operate in unfavorable conditions, such as in the presence of reflections, interference, movement of receivers/transmitters, etc., much effort is needed to correctly transmit and receive data over a wireless channel. In addition, since many wireless devices are expected to be portable and/or mobile, the applications are often constrained in terms of power consumption and computing power.

A typical node in a wireless network (referred to in the standards as a "station") includes a receive chain and a transmit chain. A transmit chain typically includes some digital processing and analog, RF circuitry that causes a signal to be transmitted into the wireless channel. A receive chain typically includes one or more antenna, RF and analog circuitry, and digital processing that seeks to output a data stream that represents what the sending transmit chain received as its input and transmitted into the wireless network.

A typical node in a wireless network includes a receive chain and a transmit chain and each chain uses only one antenna at a time. However, with multiple input, multiple output (MIMO) communication systems, more than one transmitter antenna and/or more than one receiver antenna is used, with each transmitter antenna possibly transmitting different bitstreams as other transmitter antennas and each receiver antenna preferably receiving at least a slightly different input from the channel than other receiver antennas.

MIMO communication systems are known in the art. Such systems generally include a transmitter having a number ($M_T$) of transmit antennas communicating with a receiver having a number ($M_r$) of receive antennas, where $M_r$ and $M_t$ may or may not be equal. In some keying schemes, bits of data to be transmitted are grouped and each group of bits is mapped to a symbol (a particular combination of phase and amplitude) in a signaling constellation. A number of constellations are known in the art, including binary phase-shift keying (BPSK), quadrature phase-shift keying (QPSK), and quadrature amplitude modulation (QAM) constellations. In a MIMO communication system, each of the $M_t$ transmit antenna transmits, at substantially the same time, a symbol representing a different group of bits. Thus, if each symbol represents B bits, the number of bits transmitted per channel "period" is $B*M_t$.

Each receive antenna receives a signal that is a combination of signals from the transmit antennas, modified by channel properties (e.g., fading and delay), noise, interference (intentional or unintentional) from other devices or objects radiating into the channel in range of the receiver. The receiver decodes (i.e., reconstructs) the $M_t$ transmitted signals from the $M_r$ received signals using its knowledge of the possible transmitted symbols and the properties of the communication channel. Because of the improved reception abilities of multiple antenna systems, they are often expected to receive signals with lower signal-to-noise ratios (SNR) than other systems. With a wider expected operating range in terms of SNR, correct packet detection is expected at lower SNRs, making many conventional packet detection schemes unsuitable.

Wireless networks are typically designed with layers, such as the seven networking layers known as the ISO/OSI model. The lowest of these layers is the PHY (physical) layer, concerned with transmitting signals. The next layer that interfaces the PHY layer with higher-level layers is the MAC (medium access control) layer.

The 802.11 MAC layer provides for Carrier-Sense-Multiple-Access (CSMA) protocols for time-division-multiplexing of data traffic. In such a network, data traffic is organized in packets. With CSMA, each radio checks the wireless medium to see if it is being used by others (i.e., if there are others transmitting packets) before using it. As a consequence, it is important that each device be able to accurately measure whether another device is using the medium or not, to avoid interfering with those other devices. Therefore, an 802.11 receiver must be designed with a packet detector or logic that attempts to determine when the medium is being used. A packet detector might also be used to trigger the demodulation and decoding of signals to recover packet data when a packet is detected, allowing the demodulation or and decoder or such logic to remain quiescent when no packets are present.

Typical packet detectors use an increase in signal strength seen by the demodulator as an indicator that a packet has arrived. Another method commonly used is to correlate the incoming samples from the medium with the expected preamble signal sent with every 802.11 packet. Another method used is to auto-correlate the incoming samples to determine if they have cyclic properties similar to an 802.11 packet preamble.

A "false detection" is defined as an event wherein the packet detector determines that a packet exists on the medium when in fact no packet is present. When a false detection occurs, the performance of the transceiver is severely affected. A false detection means that a carrier sense mechanism would falsely measure the channel as being busy, causing the radio's transmitter to unnecessarily defer (i.e., hold off on sending any packets into the medium) and the radio's receiver might also remain blind to any true packets that arrive from the medium. This reduces throughput and causes performance degradation due to missed packets and missed opportunities to send packets.

False detections can occur due to bursty high levels of noise from the local environment such as the laptop electronics (CPU, Ethernet controllers) which appear like packets received near the noise floor (low SNR packets). False detections can also occur due to interference from other non-802.11 devices in the same channel (e.g., Bluetooth devices). These sources of interference and noise are typically time-varying, creating additional problems.

Similar techniques might be used with non-standard 802.11 systems and non-802.11 systems, with similar shortcomings.

BRIEF SUMMARY OF THE INVENTION

In a packet detector according to embodiments of the present invention, one or more tests are performed for packet detection according to packet detection parameters associated with the one or more tests, a rate of false detection is measured, and the packet detection parameters are adjusted accordingly to reduce the rate of false detection. In specific embodiments, the rate of false detection is determined by analyzing post-detection and processing of a signal deemed to be a signal representing a packet for a failure of decoding indicative of a false detection. Such analysis might include testing for a failed SFD search, training symbol anomalies, poor conditioning of metrics used to determine frequency offset and OFDM timing, incorrect data fields, or the like.

In a particular variation, correct decoding of a packet from a nonparticipating network might be deemed a false detection so that traffic from the nonparticipating network is ignored.

The packet detector can use signals from one or more antennas. For example, in a MIMO receiver, the packet detector might use signals from all or some of the plurality of receive antennas. In some embodiments, the packet detector detects usefulness of individual antennas and might either adjust detection accordingly or output control signals to disable processing of individual antennas that are not useful to the reception process.

The following detailed description together with the accompanying drawings will provide a better understanding of the nature and advantages of the present invention.

DETAILED DESCRIPTION OF THE INVENTION

Embodiments of a transmitter and/or receiver according to aspects of the present invention are described herein. In particular, a wireless device having a transmitter and/or receiver using a packet detector is described with reference to particular examples. It should be understood that, while specific details such as network protocols and standards are described by example, the invention is not limited to specific examples. For example, while the wireless network commonly described herein is an 802.11 wireless network, the invention might be used in other wireless networks for networks wherein packet detection is important and the possibility of interference exists.

Prior to decoding bits having information content provided by a transmitter, a receiver typically senses a packet being transmitted and then performs steps to characterize the channel, synchronize with the transmitted packet, and the like. Packet detection is a process of determining that a packet is present on the channel (i.e., it is being, or has been, transmitted by a transmitter), determining the type of packet it is (at least to the extent needed to perform further processing on the packet or its contents) and to activate receiver components as needed to handle further processing.

In some receivers, the receive logic is implemented in digital signal processing (DSP) commands provided to a DSP processor. Where the logic that implements data processing of received packet data is implemented as instructions, those instructions can remain unexecuted until a packet detector indicates that the received signal contains a packet to be further processed. Where the logic that implements data processing of received packet data is implemented as hardwired circuitry, the receiver can be configured to remove or lower the power to such hardwired circuitry until a packet detector indicates that the received signal contains a packet to be further processed. In any case, processing power and/or computing effort is preserved when no packets are detected. This saves power and/or processing requirements, which are often constrained in wireless receivers. So that portions of the packet are not lost, the receiver should detect and existence of a packet and take any actions needed to start packet processing before essential elements of the packet are missed. To avoid inefficiency, the packet detector should avoid false detection.

An 802.11 receiver must deal with non 802.11 signals, such as Bluetooth, scientific equipment, RADAR signals, medical equipment or microwave ovens, as well as dealing with 802.11 signals from nonparticipating networks and the receiver's packet detector should preferably not cause false triggers on such interference.

Figure 1:
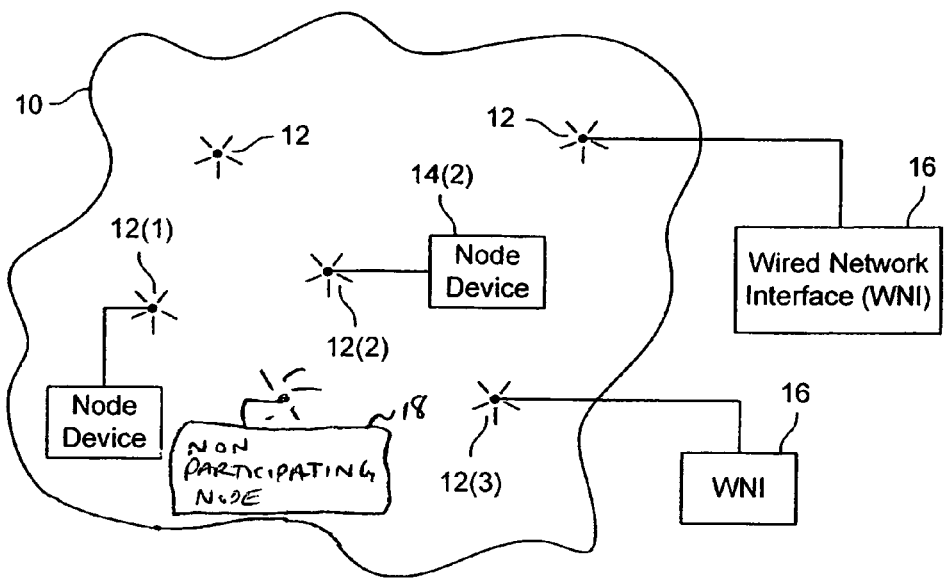
FIG. 1 is a block diagram of a simple wireless network that might use the present invention.

FIG. 1 illustrates a simple wireless network that might use the present invention. As shown in FIG. 1, a wireless network 10 comprises a plurality of nodes 12 wherein each node 12 is capable of communicating with at least one other node 12 of wireless network 10. In specific implementations, wireless network 10 is a local area wireless network, as might be used within a building, campus, vehicle or similar environments.

In a specific embodiment, wireless network 10 is designed to be compliant with one or more of the IEEE 802.11 standards. However, it should be understood that other standards and nonstandard networks might be substituted therefore to solve problems similar to those solved in the 802.11 environment. For example, the IEEE 802.11g standard contemplates different signals than the 802.11a or 802.11b standards and the 802.11 set of standards might be further modified for later developments, such the developing 802.1 ln standard. Thus, while many of the examples described herein solve the problem of detecting packets (and other tasks) in an environment where 802.11a and 802.11b packets are present, possibly with other interfering signals, the teachings of this disclosure can be used for a system where two or more other protocol standards are used, with or without the unwanted interference. In one example, at least one of the protocols is an extended 802.11a protocol usable between devices that support the protocol.

As shown, some of the nodes are coupled to node devices 14, while other nodes are coupled to wired network interfaces 16. For example, node 12(1) is coupled to node device 14(1), while node 12(3) is coupled to a wired network interface 16. FIG. 1 is intended to be a simplified and generalized diagram of a wireless network. Interfering signal generators, such as nonparticipating node 18, are assumed to be present.

Examples of node devices 14 include laptops, personal digital assistants (PDAs), or any other portable, mobile, semi portable or semi-mobile electronic device needing to communicate with other devices, or a stationary electronic device needing to communicate with other devices where a wire connection to a network or the other devices is not available— or easily provided. A portable device is one that is easily moved and an mobile device is one that is typically moving when in operation, but that distinction is not relevant for the purposes of this disclosure and the interchangeability of portable, mobile and stationary devices should be assumed unless otherwise indicated or apparent from context. Wired network interfaces 16 couple their respective nodes to a network. Examples of such networks include the Internet, a local area network (LAN) or a public or private connection to a TCP/IP packet network or other packet network or networks.

In a typical operation, a plurality of node devices are outfitted with circuitry and/or software that implements a node 12 functionality and one or more network access points are provided in wireless network 10 to provide access between such a node device and the network to which a wired network interface is coupled. In the terminology used here, a node coupled to a node device is referred to as a "station" and a node coupled to a wired network interface is referred to as an "access point". Just one example of the uses of such a system is to connect computers within a building to a network without requiring network wires to be run to each computer. In that example, the building would be outfitted with stationary access points coupled to the network which are within wireless communication range of wireless network cards in each of the stations coupled to the network.

Figure 2:
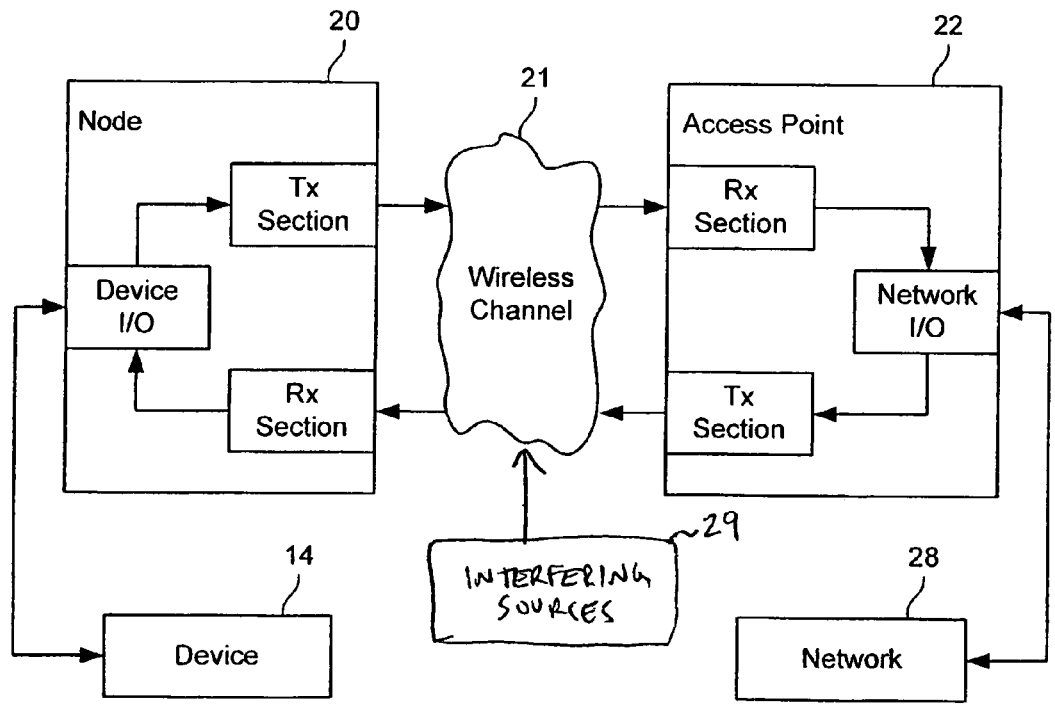
FIG. 2 is a block diagram illustrating the coupling between one device and one network connection of the wireless network shown in FIG. 1, possibly including interfering signals.

FIG. 2 shows in more detail the coupling between one device and one network connection. As shown there, node device 14 is coupled to a device I/O section of node hardware 20. Node hardware 20 includes a transmit section and a receive section, each coupled to the device I/O section. The transmit section transmits a signal through a wireless channel 21 to a receive section of access point hardware 22. That receive section is coupled to a network I/O section, thus providing a data communication path from device 14 to a network 28. A path from network 28 to device 14 is also provided via the network I/O section of access point hardware 22, a transmit section of access point hardware 22, a receive section of node hardware 20 and the device I/O section of node 20. The characteristics of wireless channel 21 depend on many factors, such as the location of node hardware 20 and access point hardware 22 as well as intervening objects, such as walls, buildings and natural obstructions, as well as influences by other devices and transmitters and receivers and signal reflecting surfaces.

Typically node hardware 20 can be integrated in with device 14. For example, where device 14 is a laptop computer, node hardware 20 might be an add-on PCMCIA card that is inserted into the laptop's PCMCIA slot. Typically access point hardware 22 is implemented as part of a wired network interface device that is just used to couple a wired network to a wireless network. Notwithstanding the typical implementation, it should be understood that nothing here prevents the diagram of FIG. 2 from being entirely symmetrical, i.e., wherein node hardware 20 and access point hardware 22 are nearly identical instances of hardware devices. The signals received by the receive sections might include signals from interfering sources 29 such as those described elsewhere herein. Where the node hardware is portable or mobile, it is often powered by a battery or batteries, in which case power consumption is a significant design consideration and reception that can be done with less power consumption is a definite benefit. The receive sections and transmit sections can comprise multiple antennas to operate as MIMO receivers/transmitters.

Figure 3:
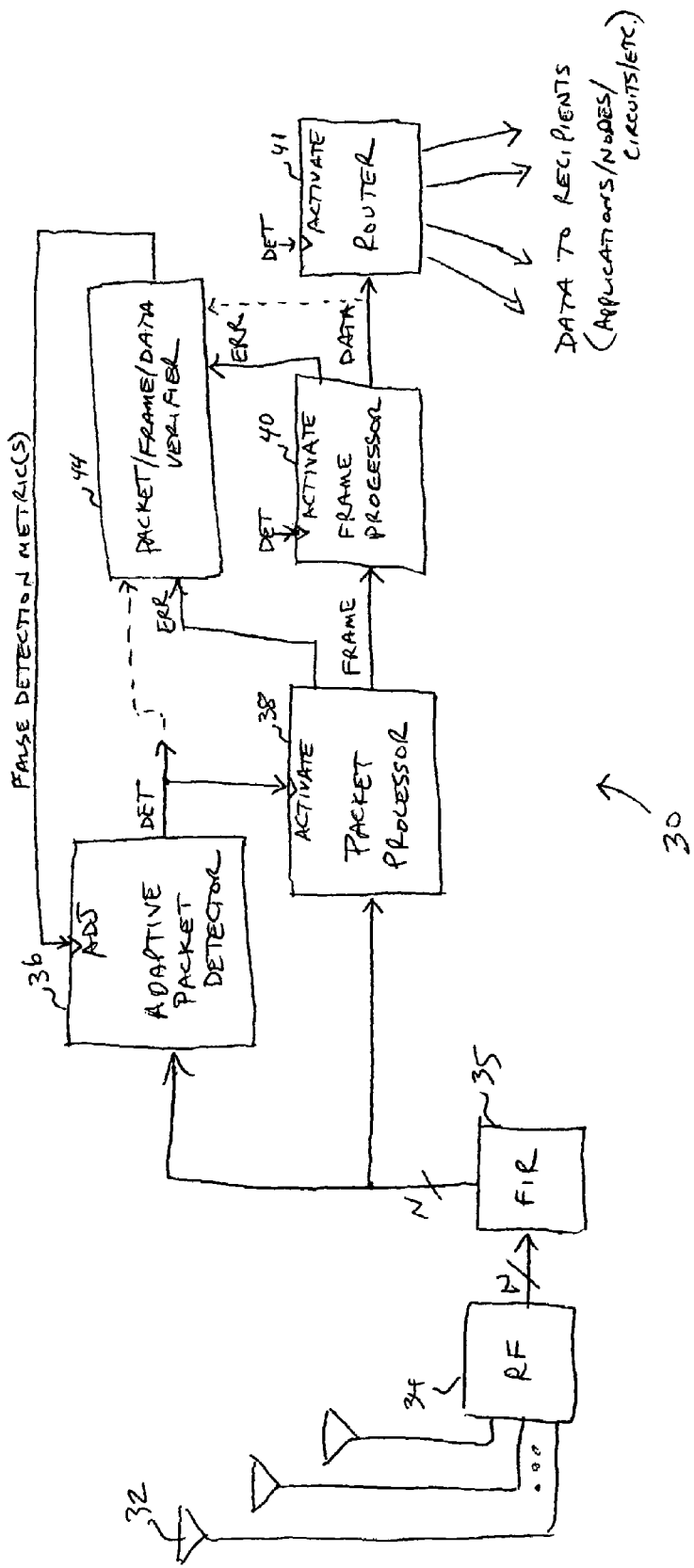
FIG. 3 is a block diagram of a receive section of node hardware as might be used in hardware illustrated in FIG. 2, including an adaptive packet detector.

FIG. 3 illustrates components of a receive section in more detail. Receive section 30 receives one or more signals over the wireless channel via antennas 32, which are initially processed by RF section 34. RF section 34 might, for example, process the signals to form baseband signals to form digital signal streams. An adaptive packet detector 36 processes input signals to determine the beginning of a packet and may provide a packet detector signal to other elements to indicate whether any further processing is needed at all. Where receive section 30 is implemented as instructions for a digital signal processor, adaptive packet detector 36 might be code that determines whether or not a packet is detected and then sets a flag that the processor uses to determine whether to execute code for the other blocks.

Further details of elements of receive section 30 not more fully described herein are shown in Steele II, which is incorporated by reference herein for all purposes. It should be understood that the present invention is not limited to the particular receiver implementations shown here or there. Some examples of how a packet detector might operate are illustrated in A water, which is incorporated by reference herein for all purposes. It should be understood that the present invention is not limited to the particular details shown there.

As illustrated in FIG. 3, the output of FIR 35 is provided to an adaptive packet detector 36 as well as to a packet processor 38. Adaptive packet detector 36 outputs a detect signal (DET) that is a control signal usable to activate other elements of receive section 30. Other illustrated elements of receive section 30 include a frame processor 40, a router 41, a verifier 44. As shown, adaptive packet detector 36 provides it's detect signal to packet processor 38, frame processor 40 and router 41. When activated, packet processor 38 processes its input signal assuming that a packet is present and outputs a decoded frame to frame processor 40. If packet processor 38 is unable to decode a valid frame, it might send an error signal to verifier 44. Frame processor 40 receives the frame from packet processor 38 when activated and processes the frame to extract transmitted data, which provides to router 41 when activated. If frame processor 40 is not able to extract valid data, it might send an error signal to verifier 44. In turn, a router 41 provides the data to its intended recipients, such as other applications, nodes, circuits, etc. operating in connection with the receiver. For example, the recipient might be a next layer of a network stack. In some embodiments, the data output by frame processor 40 is provided to verifier 44 for its use in verification.

Verifier 44 considers its inputs and then outputs one or more false detection metrics. The output can comprise a single, one-dimensional metric or a multi-dimensional detection vector. In a relatively simple case, the output is a single metric representing a rate of false detections. In a basic implementation of that embodiment, the rate of false detections is simply the number of packet failures divided by the number of packets detected, where a packet failure is measured by the receipt of an error from packet processor 38, frame processor 40 or an error in the data output by frame processor 40. As illustrated, verifier 44 can optionally receive the detect signal from adaptive packet detector 36. Alternatively, verifier 44 can infer detection of a packet from activity in other elements.

Figure 4:
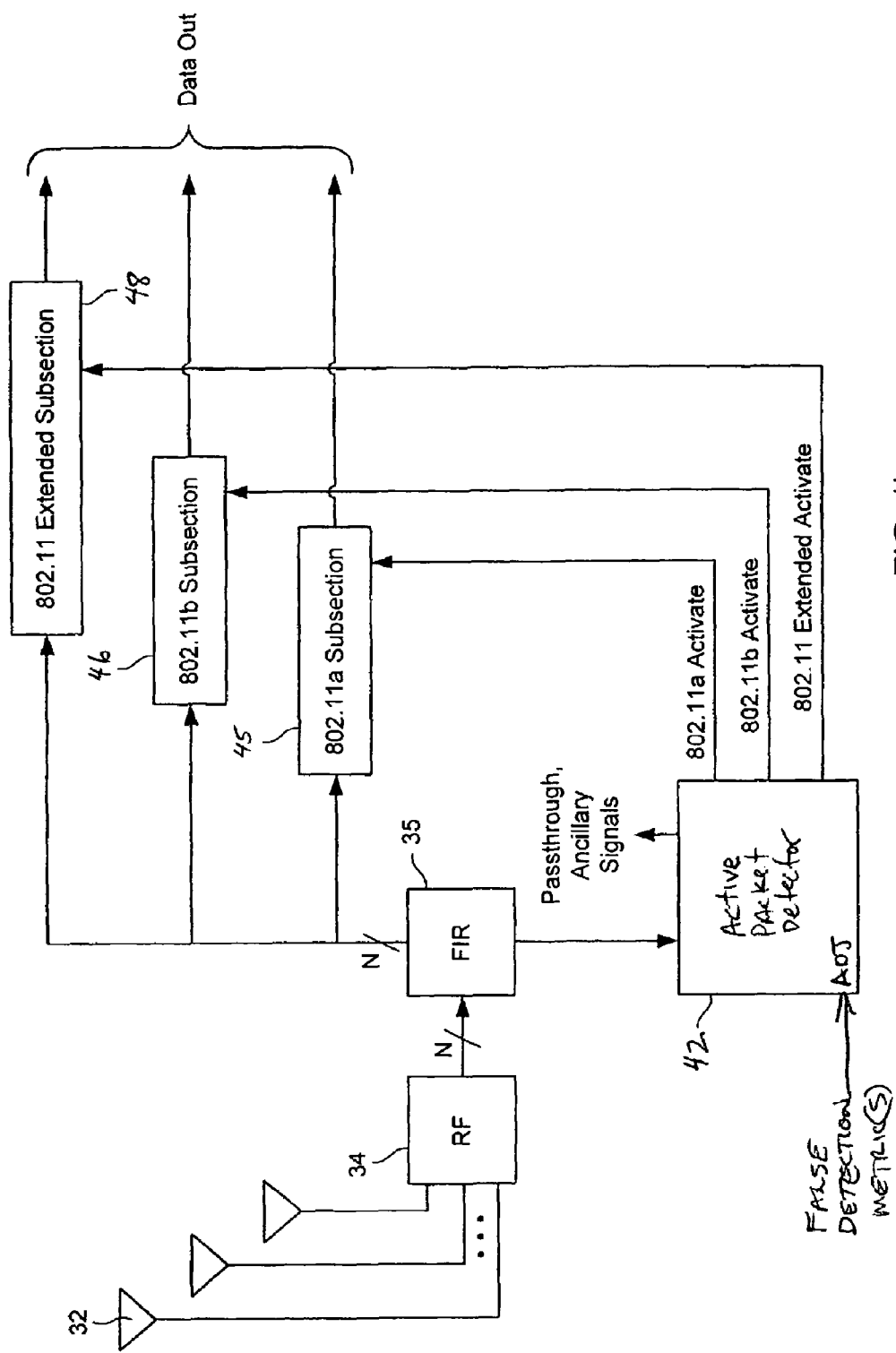
FIG. 4 is a block diagram of portions of a receiver including an adaptive packet detector for jointly detecting a plurality of packet types.

FIG. 4 illustrates a variation of a receive section that includes an adaptive packet detector 42 for controlling a plurality of receiver subsections 45, 46, 48. Each subsection might include an instance of the elements shown in FIG. 3 that are activated by the adaptive packet detector. Where appropriate, adaptive packet detector 42 independently controls receiver subsections. As shown, the receive section include subsections 45, 46, 48 for processing 802.11a, 802.11b and 802.11 extended signals, respectively.

Adaptive packet detector 42 processes input signals to determine the beginning of a packet and may provide a packet detector signal to other elements, such as subsections 45, 46, 48, to indicate whether any further processing is needed at all. Where receive section 30 is implemented as instructions for a digital signal processor, adaptive packet detector 42 might be code that determines whether or not a packet is detected and then sets a flag that the processor uses to determine whether to execute code for the other blocks.

FIG. 4 shows multiple detect signals being provided, possibly along with other signals ("ancillary signals" used by other elements as well as adaptive packet detector 42 and "pass through signals" generated but not used directly by adaptive packet detector 42) derived from some of the same processing.

In some implementations, "detect" control signals are binary indicators, but in other implementations the control signals can be multilevel, indicating a probability, confidence or certainty value as to whether a packet really was detected. It is possible that an element that relies on a multilevel packet detection control signal can take one of three or more processing paths based on that control signal. In a simple case, the control signal is binary and the element performs actions for the control signal being in one state and does not take any action for the control signal being in the other state, for example, signaling a packet detection and no packet detection, respectively. Typically a binary decision needs to be made as to whether or not to start some action, the so the control signal would be expected to ultimately reduce to a binary signal.

Possible Packet Detection Methods

One or more packet detection methods might be used to signal the existence of a packet in an adaptive packet detector such as those illustrated and described above or in other adaptive packet detectors according to aspects of the present invention.

In one method, an energy detector uses changes in signal strength seen by the receiver as indicators that a packet has arrived. There are many types of energy detectors. One example is a basic energy comparison with the noise floor. Equation 1 represents a test performed by one such energy detector. That energy detector compares an average of the squares of incoming samples x(k) to an energy threshold, ED, representing the noise floor by which a packet arrival is defined.

$$Ave(|x(k)|^2) \geq ED \qquad \text{(Equ. 1)}$$

An alternative differential energy detector is shown in Equation 2.

$$|x(k+1)|^2 - |x(k)|^2 \geq DED \qquad \text{(Equ. 2)}$$

A cross-correlation type packet detector is shown in Equation 3, where the y(k) values are known values given by the preamble of an 802.11a, an 802.11 g or an 802.11b packet.

$$\left| \sum_k y(k)^* x(k) \right|^2 \geq CCD \qquad \text{(Equ. 3)}$$

An auto-correlation type packet detector is shown in Equation 4, where the value L is the frequency of the cyclic structure given by the 802.11a, 802.11g or 802.11b preamble.

$$\left| \sum_k y(k)^* x(k-L) \right|^2 \geq ACD \qquad \text{(Equ. 4)}$$

Other variations are well known of these four types of packet detectors. For example, variations described in Awater or Gardner, which are incorporated by reference herein for all purposes.

Packet detection might employ multiple tests, such as a combination of the ED and ACD tests.

Determination of a Packet Detection Being a False Packet Detection

A false detection can be determined by comparing instances where a packet detector determines that a packet is present on the medium, but a receiver attempting to demodulate and decode the signal to obtain the packet data rejects the signal due to an incorrect signal structure identified later in the processing. A false detection is normally distinguishable from a failed decode of an actual packet due to noise. Thus, for a false detection, the receiver attempts to decode noise or other non-packet signal and fails because the signal is not in fact a packet.

Measuring a false detection can be done by monitoring the states through which a detected packet is processed. For example, if laptop noise triggers the packet detector, then the receiver will attempt to demodulate and decode the signal to recover the packet data. At some state in the processing, such as frequency offset estimation or OFDM timing estimation, the receiver will conclude that no packet really exists and a false detection will be logged. Also, the receiver will preferably halt the processing and reset.

A packet may pass early stages and fail later, such as when a signal field is being tested for. False detections can be monitored for a plurality of packet types, for example, a false detection rate might be tracked separately for OFDM type packets and CCK type packets.

Examples of processes for determining that a detection is a false detection might include:

1. For an 802.11b packet, a failed SFD search indicates that the samples being analyzed are not a true 802.11b packet.

2. For an 802.11b or an 802.11a packet, the same detection metric that lead to the false detection can be calculated again on a second part of the 802.11a or 802.11b preamble. If it does not meet the detection criterion this second time, it can be counted-as-a false detection.
3. For an 802.11a packet, a large difference between the two long training symbols indicates a false detection.
4. A poor conditioning of metrics used to determine frequency offset and OFDM timing indicates a false detection. For example, if the frequency offset is outside a reasonable boundary, or if the timing search criteria does not have an obvious optimal timing value.
5. An incorrect signal or service field may indicate a false detection for both 802.11a and 802.11b.
6. A sudden rise in received signal power may indicate that a true packet is starting at that time and that the samples already being analyzed do not represent a true packet.
7. The correct decoding of a packet sent from another BSS may be deemed a false detection if it is desired that the receiver be insensitive to other BSS communications.

The Adaptive Detection Method

A basic method is described herein, followed by more complex examples. A basic method uses one or more tests with thresholds determined by adjustable parameters, which parameters are adapted based on results of a determined false detection rate (or similar metric) to reduce the rate or number of false detections. The reduction can be a relative rate (e.g., 50% reduction), a threshold rate (e.g., no more than X false detections per unit time), or a reduction measure that reflects performance (e.g., reduce false detections until performance of a transceiver is above some desired measure).

A false detection rate can be monitored continuously or periodically and compared to desired values for a false detection rate, such as the maximum allowable false detection rate before transceiver performance degradation is measurable. Once the false detection rate is sufficient to affect performance, the detection thresholds are adjusted to reduce false detection rates.

For example, consider the case where a laptop PC begins to generate significant interference and the false detection rate rises. The transceiver will begin to defer transmissions of packets due to false packet detection, reducing outbound throughput. Also, true packets intended for the transceiver will be missed while the transceiver is processing the false signal, increasing packet error rates. An adaptive detection process can alter the detection thresholds so as to reduce false detections, which will improve performance in the presence of this interference. Once the interference subsides, the thresholds might be lowered to the previous values or other lower values, thus again allowing for more sensitive packet detection.

One series of steps that might be used is as follows:
1. If the false detection rate is higher than a maximum desired false detection rate, then adjust the threshold for a given test higher by some incremental value.
2. If the false detection rate is lower than a minimum desired false detection rate, then adjust the threshold for the test lower by the same or a different incremental value.
3. If the false detection rate is between the minimum desired false detection rate and the maximum desired false detection rate, leave the threshold value alone.
4. Optionally, there might be a minimum and maximum threshold value beyond which increments and decrements are not made regardless of the false detection rate.

In another variation, more than one test is used and the threshold values that can be altered might include some linear or nonlinear combination of one or more of ED, DED, CCD and ACD in Equations 1-4 above. The false detection rate can be computed over time as the number of false detections in a subscribed period of time, or a false detection rate as the number of false detections as compared to the number of true packets detected.

A filter can be applied to obtain a smooth false detection rate as a function of time. False detection rates can be separately maintained for different types of packets, such as one rate for OFDM packets, another rate for CCK packets, and another rate for Barker packets. Alternatively, a total false detection rate can be computed as the sum of OFDM, CCK, Barker or other false detections.

Other parameters that can be configured include the minimum and maximum desired false detection rate, the increase and decrease increments for each threshold (e.g., ED, ACD), the minimum and maximum threshold values, and the rate at which the evaluation process is executed. The time interval between two successive samplings of the false detection rate may be altered to speed up or slow down the adaptation depending on noise and interference conditions. An adjustment interval may be used to regulate threshold changes based on the rate at which packets are being received.

The values computed and/or used by the various processes can be stored per channel, for channel-specific adaptation, and/or per frequency band, to determine preferable channels on which to operate.

Typical values for the processes might be a minimum detection threshold of 5 per second, a maximum detection threshold of 10 per second, an increase of ED by 2 dBm, a decrease of ED by 1 dBm, a maximum ED value of −85 dBm, a minimum ED value of −95 dBm, and an evaluation rate of 100 ms.

Combining Packet Detecting with Channel Scanning

For every frequency channel, the optimal threshold setting can be different. Therefore, when the station decides to change to a new frequency, when it has lost connectivity to the original AP, it has to rerun the adaptive threshold setting process. However, the settling time for the process may be too long, causing the Authentication/Association messages to not get sent out quickly enough. Possible solutions to this problem include not deferring while scanning, setting the defer threshold to a "high" value that is almost certainly guaranteed to be above the laptop's (or other device's) noise floor, when scanning to a new channel and seeing beacons, reading the RSSI from the beacons and setting the threshold to a few dB less than the RSSI, and then trying to associate. Once it has associated, restore the threshold to the default value.

Combining packet detection with channel scanning has a number of benefits. For example, noise might be different from channel to channel. A receiver and/or transmitter/receiver might perform adaptive packet detection on each channel and use those results to decide which channel to use. Using a better channel provides a number of benefits, such as allowing for more sensitive reception. Using false packet detection metrics instead of, or in combination with, other channel quality measurements, may provide for a better measure of which channel is preferred.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A wireless receiver that receives a received signal from a wireless channel and detects from the received signal the presence of a packet, the wireless receiver comprising:
a packet detector having an adaptive packet detection process;
logic to process the received signal when the packet detector indicates presence of a packet;
a false detection determiner for determining whether the signal indeed represents a packet; and
logic for adjusting the adaptive packet detection process when a false detection metric is outside a target range wherein the adaptive packet detection process, based on the logic for adjusting the adaptive packet detection process and/or a false detection metric, adjusts a threshold for a given detection test accordingly and wherein the adjustment of the threshold is such that when a false detection rate is higher than a maximum desired false detection rate, the threshold for a given test is raised by a first incremental value, when the false detection rate is lower than a minimum desired false detection rate, the threshold for the given test is lowered by the same or a different incremental value, and when the false detection rate is between the minimum desired false detection rate and the maximum desired false detection rate, the threshold value is not modified.

2. The wireless receiver of claim 1, wherein the false detection metric is a false detection rate.

3. The wireless receiver of claim 2, wherein the target range is bounded by a maximum false detection rate and the logic for adjusting the adaptive packet detection process includes logic to adjust a detection threshold to be more selective for detection when the maximum false detection rate is approached, equaled and/or exceeded.

4. The wireless receiver of claim 1, wherein the false detection metric is a rate a signal is assumed to be a packet, but is not, compared with the number of times signals are assumed to be packets.

5. The wireless receiver of claim 1, wherein the false detection determiner includes logic to search for an start of frame delimiter (SFD), a failure of such search being determined to be a false detection.

6. The wireless receiver of claim 1, wherein the false detection determiner includes logic to determine if training symbol anomalies exist, the existence of which is determined to be due to a false detection.

7. The wireless receiver of claim 1, wherein poor conditioning of frequency offset metrics is a condition that is deemed to be a false detection.

8. The wireless receiver of claim 1, wherein poor conditioning of OFDM timing is a condition that is deemed to be a false detection.

9. The wireless receiver of claim 1, wherein the presence of incorrect data in a decoded frame is determined to be a false detection.

10. The wireless receiver of claim 1, wherein the false detection determiner includes logic to identify packets from nonparticipating networks wherein identification of packets from a nonparticipating networks is deemed to be a false detection.

11. The wireless receiver of claim 1, wherein the false detection determiner uses a detection metric on a first portion of a received signal presumed to be a packet preamble and uses the detection metric on a second portion of the received signal and deems the signal to be a false detection if one or both uses indicate a false detection.

12. The wireless receiver of claim 1, wherein the false detection determiner includes logic to detect an incorrect signal or service field and deem such to be a false detection.

13. The wireless receiver of claim 1, wherein the false detection determiner includes logic to detect an anomaly in packet structure and deem such to be a false detection.

14. The wireless receiver of claim 1, wherein the false detection determiner deems an unexpected rise in received signal power as a false detect if the wireless receiver is processing a signal as an assumed packet.

15. The wireless receiver of claim 1, wherein increments and decrements are not made regardless of the false detection rate beyond the incremental value that is raised or lowered.

16. The wireless receiver of claim 1, wherein the packet detector detects packets according to an energy level of incoming signals.

17. The wireless receiver of claim 1, wherein the packet detector detects packets according to a differential energy level of incoming signals.

18. The wireless receiver of claim 1, wherein the packet detector detects packets according to a cross-correlation test.

19. The wireless receiver of claim 1, wherein the packet detector detects packets according to an auto-correlation test.

20. A wireless MIMO receiver that receives a received MIMO signal from a wireless channel and detects from the received MIMO signal the presence of a packet using a plurality of receive antennas, the wireless MIMO receiver comprising:
a packet detector having an adaptive packet detection process;
logic to process the received signal when the packet detector indicates presence of a packet;
a false detection determiner for determining whether the signal indeed represents a packet;
and logic for adjusting the adaptive packet detection process when a false detection metric is outside a target range wherein the adaptive packet detection process, based on the logic for adjusting the adaptive packet detection process and/or the false detection metric, adjusts a threshold for a given detection test accordingly and wherein the adjustment of the threshold is such that when a false detection rate is greater than a maximum desired false detection rate, the threshold for a given test is elevated by a first incremental value, when the false detection rate is less than a minimum desired false detection rate, the threshold for the given test is lowered by the same or a different incremental value, and when the false detection rate is between the minimum desired false detection rate and the maximum desired false detection rate, the threshold value is not changed.

21. The wireless MIMO receiver of claim 20, wherein the false detection metric is a false detection rate and the target range is a false detection rate below a predetermined threshold.

22. A wireless receiver that receives a received signal from a wireless channel and detects from the received signal the presence of a packet using a plurality of receive antennas, wherein the wireless channel is selected from among a plurality of wireless channels, the wireless receiver comprising:
a channel selector for selecting a channel among a plurality of wireless channels on which to receive signals;
a packet detector having an adaptive packet detection process for each of the plurality of channels;

logic to process the received signal when the packet detector indicates presence of a packet on the selected channel;

a false detection determiner for determining whether the signal indeed represents a packet;

logic for adjusting the adaptive packet detection process when a false detection metric is outside a target range; and logic for adjusting a signal processing step according to the false detection metric for the-selected channel wherein the adaptive packet detection process, based on the logic for adjusting the adaptive packet detection process and/or the false detection metric, adjusts a limit for a given detection test accordingly and wherein the adjustment of the limit is such that when a false detection rate is greater than a maximum desired false detection rate, the limit for a given test is elevated by a first incremental value, when the false detection rate is less than a minimum desired false detection rate, the limit for the given test is lowered by the same or a different incremental value, and when the false detection rate is between the minimum desired false detection rate and the maximum desired false detection rate, the limit value is not changed.

23. The wireless receiver of claim 22, wherein the false detection metric is a false detection rate and the target range is a false detection rate below a predetermined threshold.

* * * * *